(No Model.) 2 Sheets—Sheet 1.
E. & T. FLORY.
APPARATUS FOR EXPRESSING CIDER.
No. 602,620. Patented Apr. 19, 1898.
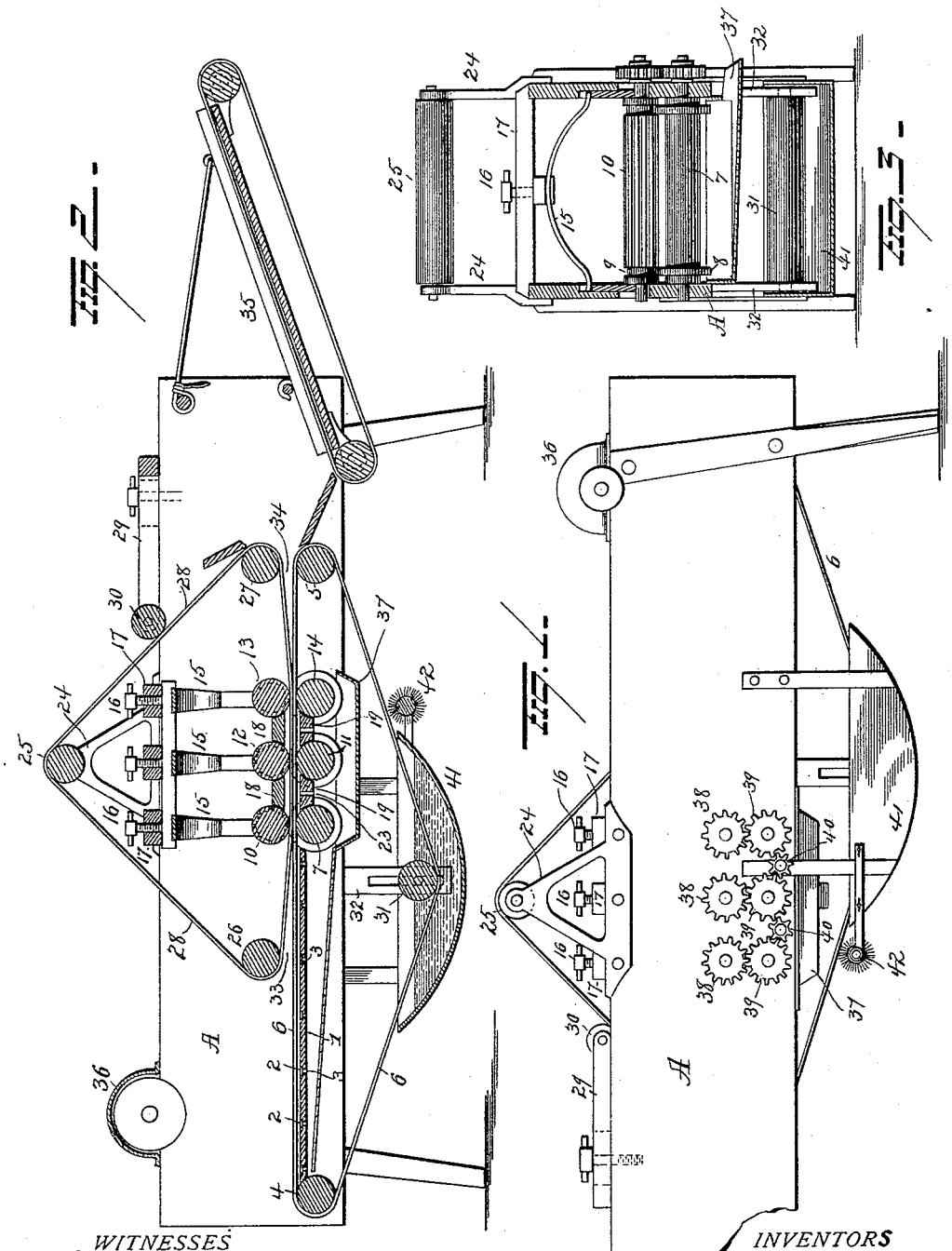
WITNESSES
E. I. Nottingham
G. F. Downing
INVENTORS
E. & T. Flory
By H. A. Seymour
Attorney

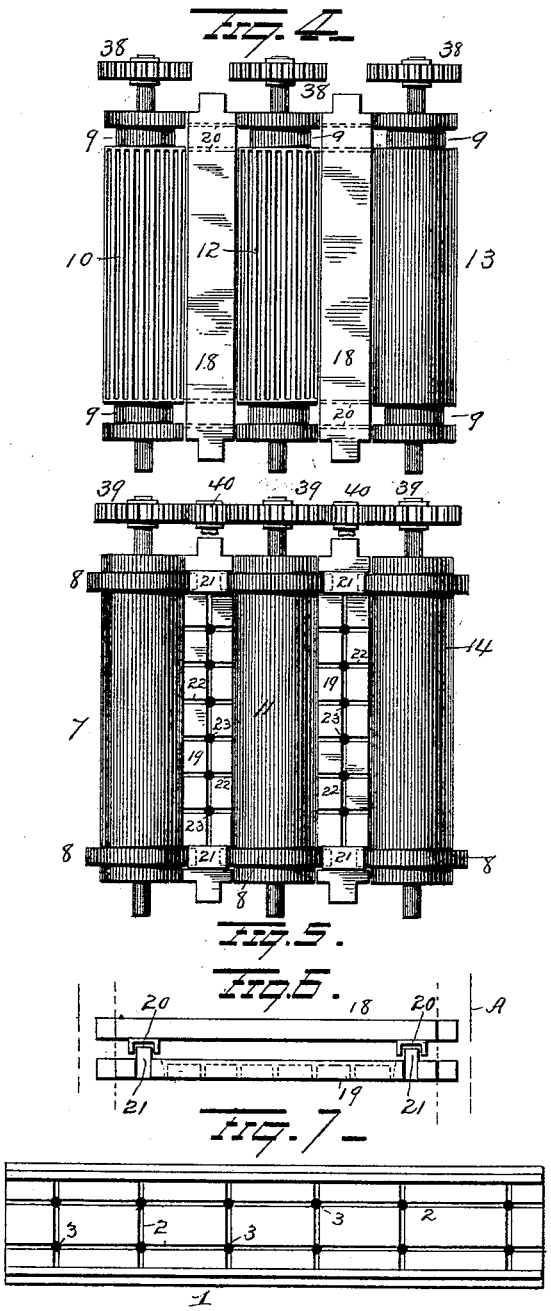

UNITED STATES PATENT OFFICE.

ELI FLORY AND TIMOTHY FLORY, OF DEFIANCE, OHIO.

APPARATUS FOR EXPRESSING CIDER.

SPECIFICATION forming part of Letters Patent No. 602,620, dated April 19, 1898.

Application filed August 25, 1897. Serial No. 649,469. (No model.)

*To all whom it may concern:*

Be it known that we, ELI FLORY and TIMOTHY FLORY, residents of Defiance, in the county of Defiance and State of Ohio, have invented certain new and useful Improvements in Apparatus for Expressing Cider; and we do hereby declare the following to be a full, clear, and exact description of the invention, such as will enable others skilled in the art to which it appertains to make and use the same.

Our invention relates to an improved apparatus for expressing cider; and it consists in certain novel features of construction and combinations and arrangements of parts, as hereinafter set forth, and pointed out in the claim.

In the accompanying drawings, Figure 1 is a view of our improved apparatus. Fig. 2 is a longitudinal sectional view. Fig. 3 is a transverse sectional view. Figs. 4, 5, 6, and 7 are detail views.

A represents a frame or trough, in one end of which a board 1 is located, and provided with grooves or channels 2 and perforations 3. Rollers 4 5 are mounted at or near the respective ends of the frame or trough A, and over these rollers and the board 1 an endless apron 6 passes.

Beyond the inner end of the board 1 three pairs of rollers are mounted in the sides of the frame or trough, the rollers of each pair being arranged one above the other. The lower roller 7 of the first pair is made with a smooth peripheral surface and is provided at or near its ends with peripheral flanges 8, which enter grooves 9 in the coöperating upper roller 10, so as to prevent the escape of cider from between the ends of the rollers. The upper roller 10 is preferably made with a grooved or corrugated peripheral face, and the journals of said upper roller are mounted in movable bearings in the sides of the frame or trough. The rollers 11 12 of the intermediate pair are constructed exactly the same as the rollers 7 and 10, and the rollers 13 14 are constructed the same as the other two pairs, except that the upper roller 13 of the last pair is preferably made with a plain peripheral face instead of corrugated.

The upper roller of each pair is mounted in movable bearings in the sides of the frame, on which bearings springs 15 bear. The springs 15 are carried by screws 16, by which their pressure on the journals of the upper rollers can be adjusted. The screws 16 are supported by transverse bars 17, secured to the frame or trough.

Blocks or bars 18 are located between the upper rollers, and blocks or bars 19 are placed between the lower rollers. The upper blocks or bars are provided near their ends with recesses 20 for the reception of flanges 21 on the lower blocks or bars, whereby to prevent the escape of cider from between the ends of said blocks or bars. The lower blocks are preferably made with grooves 22 and holes 23, through which cider can pass.

A bracket 24 is secured to each side of the frame or trough and made to extend above the same. The journals of a transverse roller 25 are mounted on the brackets 24, and other rollers 26 and 27 are mounted between the sides of the frame, the roller 27 being located near the discharge end thereof. Over the rollers 25, 26, and 27 an endless apron 28 passes, said apron also passing between the several pairs of pressing-rollers and over the apron 6. An adjustable frame 29 is mounted on the frame or trough and has a roller 30 mounted therein adapted to bear against the apron and serve to maintain the same taut. The apron 6 is maintained taut by means of a roller 31, mounted in movable bearings in arms 32, depending from the frame or trough. The rollers 26 and 27 are so disposed that the apron 28 passing over them will form, with the apron 6, an inlet-chute 33 and an outlet-chute 34 at the respective sides of the series of pressing-rollers.

At the discharge end of the frame or trough A an inclined carrier 35 is located and adapted to receive the pomace escaping from the outlet-chute 34 and convey it a distance from the frame or trough.

A crusher 36 of any desired form of construction is located at the inlet end of the apparatus. The apples will be discharged into this crusher and will be discharged therefrom onto the apron 6, by which they will be carried by said apron to the inlet-chute 33, formed by the two aprons, and then through the pressing-rollers. The cider expressed from the apples will flow through the apron 6 into a trough 37 and from the latter to a suitable barrel or other device provided for its reception. Any juice which might pass through the apron 6 when the crushed apples fall thereon from the crusher will be caught by the board 1 and conducted thereby to trough 37.

Each pair of crushing-rollers is provided with intermeshing pinions 38 39, and between the pinions of the lower rollers intermediate pinions 40 are located, so that when motion is imparted (by any suitable means) to one of said pinions the motion will be transmitted to all of them, and thus the various pressing-rollers will be set into motion.

In order to cleanse the endless apron 6, a water-tank 41 is suspended from the framework, through which tank the apron passes. To further insure the removal of pomace from the endless apron 6, a revoluble brush 42 is adjustably attached at one end of the tank and provided with means whereby to receive motion from the gearing.

Various slight changes might be made in the details of construction herein shown and described without departing from the spirit and scope of our invention; and hence we would have it understood that we do not limit ourselves to the precise details of constructions herein shown and described.

Having fully described our invention, what we claim as new, and desire to secure by Letters Patent, is—

The combination with a frame, a set of rollers, journaled therein, vertically-movable journal-boxes, rollers journaled in these boxes and coöperating with the other set of rollers, and means for varying the spring-pressure upon the boxes, of belts passed around these sets of rollers, perforated blocks or bars interposed between the rollers of the lower set, and imperforate ones between the upper ones, said sets of boards having grooves and flanges at or near their ends whereby to prevent the passage of cider at that point.

In testimony whereof we have signed this specification in the presence of two subscribing witnesses.

ELI FLORY.
      TIMOTHY FLORY.

Witnesses:
 W. D. HILL,
 H. G. BAKER.